United States Patent [19]
Kawai

[11] Patent Number: 5,829,984
[45] Date of Patent: Nov. 3, 1998

[54] CHART FOR MEASUREMENT OF NON-ALIGNMENT CHARACTERISTICS AND TILTING DIRECTION TYPE OF SKELETON

[76] Inventor: Takeo Kawai, 69-20 Torigaoka, Totsuka-ku Yokohama-shi, Japan

[21] Appl. No.: 568,340

[22] Filed: Dec. 6, 1995

[51] Int. Cl.⁶ ................................................. G09B 23/28
[52] U.S. Cl. ........................................... 434/274; 434/267
[58] Field of Search ................................ 602/1; 128/845, 128/846; 606/60, 61; 40/381; 434/257, 274, 428, 267

[56] References Cited

U.S. PATENT DOCUMENTS

| | | | |
|---|---|---|---|
| 4,624,642 | 11/1986 | Ferrara | 434/257 |
| 4,734,039 | 3/1988 | Thompson | 434/274 |
| 4,872,841 | 10/1989 | Hamilton | 434/274 |

*Primary Examiner*—Michael A. Brown
*Attorney, Agent, or Firm*—Cushman Darby & Cushman IP Group of Pillsbury Madison & Sutro, LLP

[57] ABSTRACT

A chart for measuring a non-alignment characteristics and tilting direction type is used in preparatory stage of treatment for various diseases, for inspecting non-parallel tilt of skeleton of a subject of inspection, and when non-parallel tilt is caused in a body of the subject of inspection, determining the tiling direction type of the subject of inspection. The chart includes a tender point inspection chart containing a human body chart illustrating a human body, and a plurality of tender point inspecting points, at each of which inspection is to be performed for checking whether a tender point is present or not, the plurality of tender point inspecting points are symmetric at both lateral sides with respect to a center axis of the human body, and a tilting direction pattern chart containing the human body chart, a plurality of tender point designating points arranged at respective positions where the tender points are present with respect to respective tilting direction types as tender point patterns, muscular apparatus respectively associated with respective tilting direction types, and symptom patterns respectively corresponding to the muscular apparatus associated with the tilting direction types, and the tilting direction type pattern chart including a plurality of charts respectively illustrating tender points distribution respectively corresponding the tilting direction types.

6 Claims, 17 Drawing Sheets

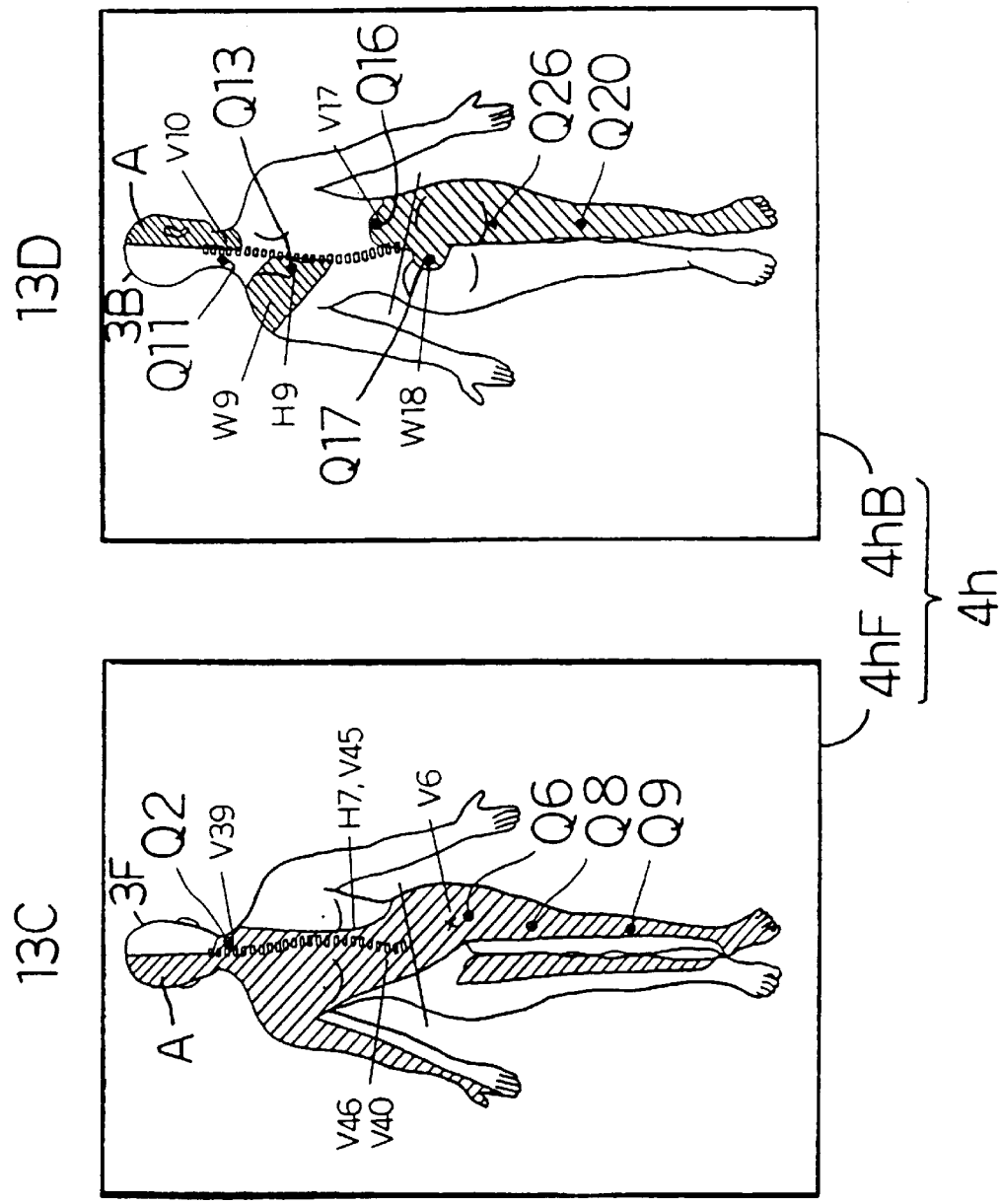

FIG. 14b
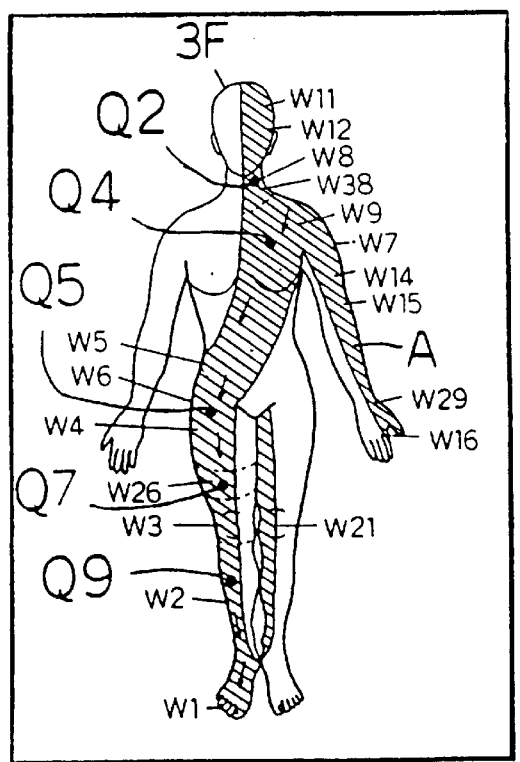
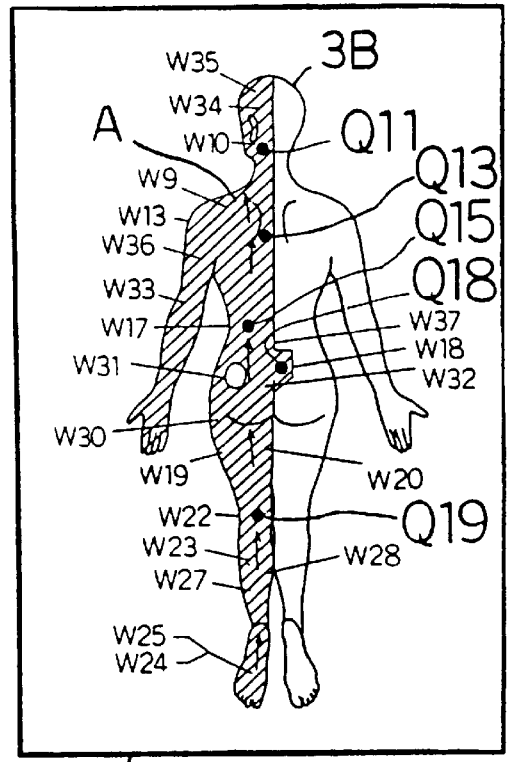

5,829,984

CHART FOR MEASUREMENT OF NON-ALIGNMENT CHARACTERISTICS AND TILTING DIRECTION TYPE OF SKELETON

BACKGROUND OF THE INVENTION

1. Field of the Invention

The present invention relates generally to a chart for measurement of a non-alignment characteristics and tilting direction type of a skelton. More particularly, the invention relates to a chart for measurement of non-alignment characteristics of a skelton of a human body as a subject of inspection as a preparator stage of treatment of various disease.

2. Description of the Related Art

Various treatment or therapy for various diseases are conventionally known. One typical way of therapy is muscular apparatus treatment called as "Kinkeitai Treatment". The principle of the muscular apparatus treatment will be discussed for facilitating understanding of the invention. Basically, various diseases are caused by non-natural alignment of the bone system or skelton of the human body. Therefore, diseases can be cured by restoring natural alignment of the skelton. The muscular apparatus treatment, "Kinkeitai Treatment" has been known to have therapeutic effect for various diseases for large number of clinical examples.

The bones in the skelton are connected or coupled with muscles and/or ligments (hereinafter simply referred to as "muscles"). With the muscles, the bones are supported and moved. During contraction by tension, the muscles can become impossible to relax. This is called as contracture. Local distribution of contracture on the human body may result in non-alignment offset of the bone to cause non-parallel tilting of the skelton. Here, the muscular apparatus affecting the alignment of bone system or skelton is referred to as "Kinkeitai". On the portion of the body where the contracture is present, a tender point is present. When non-alignment is caused on the human body, namely when the human body causes non-parallel tilt in the skelton, the human body may show various non-parallel tilting types.

For example, the lumber vertebrae may tilt to project toward right or left or in S-shaped fashion. Such types of non-parallel tilting would be hereinafter referred to as tilting tendency. Upon performing treatment, it is important to adapt the treatment for the tilting tendency. Therefore, it becomes necessary to measure the non-alignment characteristics and/or the tilting tendency of the subject of inspection as preparation for treatment.

Conventionally, to obtain information concerning the non-alignment characteristics and/or tilting tendency, inquiry and/or external observation are performed to the subject of inspection by a tester, or a X-ray inspection is performed for the skeleton of the subject of inspection.

In the conventional method, it is possible to measure whether the skeleton of the subject of inspection is causing non-parallel tilt, and the tilting tendency when non-parallel tilt is present in certain extent. However, it is possible that the subject of inspection cannot fully express his or her symptom during inquiry to cause a difficulty to accurately judge the non-alignment characteristics and the tilting tendency. Also, since the external appearance of human body is unique per each subject of inspection, it is required high level qualification to make accurate judgement for the non-alignment characteristics and the tilting tendency for the tester. Furthermore, in order to perform X-ray inspection for the skeleton, it is inherently required to have X-ray inspection equipment, such as skiagraphic equipment and so forth to elevate a cost for measuring the non-alignment characteristics and/or tilting tendency of the skeleton.

SUMMARY OF THE INVENTION

Therefore, it is an object of the present invention to provide a chart for measurement of a non-alignment characteristics and a tilting direction type of a skeleton which can solve the problems set forth above.

According to one aspect of the invention, a chart for measuring non-alignment characteristics and tilting direction type, to be used in preparatory stage of treatment for various diseases, for inspecting non-parallel tilt of skeleton of a subject of inspection, and when non-parallel tilt is caused in a body of the subject of inspection, determining the tilting direction type of the subject of inspection, comprises:

a tender point inspection chart containing a human body chart illustrating a human body, and a plurality of tender point inspecting points, at each of which inspection is to be performed for checking whether a tender point is present or not, the plurality of tender point inspecting points are symmetric at both lateral sides with respect to a center axis of the human body;

a tilting direction pattern chart containing the human body chart, a plurality of tender point designating points arranged at respective positions where the tender points are present with respect to respective tilting direction types as tender point patterns, muscular apparatus respectively associated with respective tilting direction types, and symptom patterns respectively corresponding to the muscular apparatus associated with the tilting direction types, and the tilting direction type pattern chart including a plurality of charts respectively illustrating tender points distribution respectively corresponding the tilting direction types.

In the preferred construction, the tender point inspection chart and the tilting direction pattern charts are recorded on sheet form medium, separately from each other. In such case, the sheet form medium may be a paper.

In the alternative, the tender point inspection chart and the tilting direction pattern chart may stored in a storage device of a computer system.

According to another aspect of the invention, a method for inspection of non-alignment characteristics and tilting direction type of a body of a human subject of inspection comprises the steps of:

providing a tender point inspection chart containing a human body chart illustrating a human body, and a plurality of tender point inspecting points, at each of which inspection is to be performed for checking whether a tender point is present or not, the plurality of tender point inspecting points are symmetric at both lateral sides with respect to a center axis of the human body;

depressing portions of the body of the subject of inspection corresponding to respective tender point inspecting points on the tender point inspection chart with inquiring to the subject of inspection whether pain is present under depression at the currently depressed portion of the body for finding tender points presenting in the body of the subject of inspection;

marking respective tender point inspecting points where pain is present as depressed, as inspected tender points; and checking distribution of the inspected tender points on the tender point inspection chart for making judgement whether non-parallel tilt of a skeleton of the subject of inspection is present or not depending upon symmetricalness of the distribution of the inspected tender points with respect to a center axis of the body of the subject of inspection.

In the preferred constriction, the method may further comprises the steps of:

providing a tilting direction pattern chart containing the human body chart, a plurality of tender point designating points arranged at respective positions where the tender points are present with respect to respective tilting direction types as tender point patterns, muscular apparatus respectively associated with respective tilting direction types, and symptom patterns respectively corresponding to the muscular apparatus associated with the tilting direction types, and the tilting direction type pattern chart including a plurality of charts respectively illustrating tender points distribution respectively corresponding the tilting direction types; and when non-parallel tilt is present in the body of the subject of inspection, comparing an inspected pattern formed by the inspected tender points with the plurality of tender point patterns for finding one of the tender point patterns approximately matching with the inspected pattern and statistically determining tilting direction type of the body of the subject of inspection.

BRIEF DESCRIPTION OF THE DRAWINGS

The present invention will be understood more fully from the detailed description given herebelow and from the accompanying drawings of the preferred embodiment of the invention, which, however, should not be taken to be limiting to the present invention, but are for explanation and understanding only.

In the drawings.

DESCRIPTION OF THE PREFERRED EMBODIMENT

Figure 1:
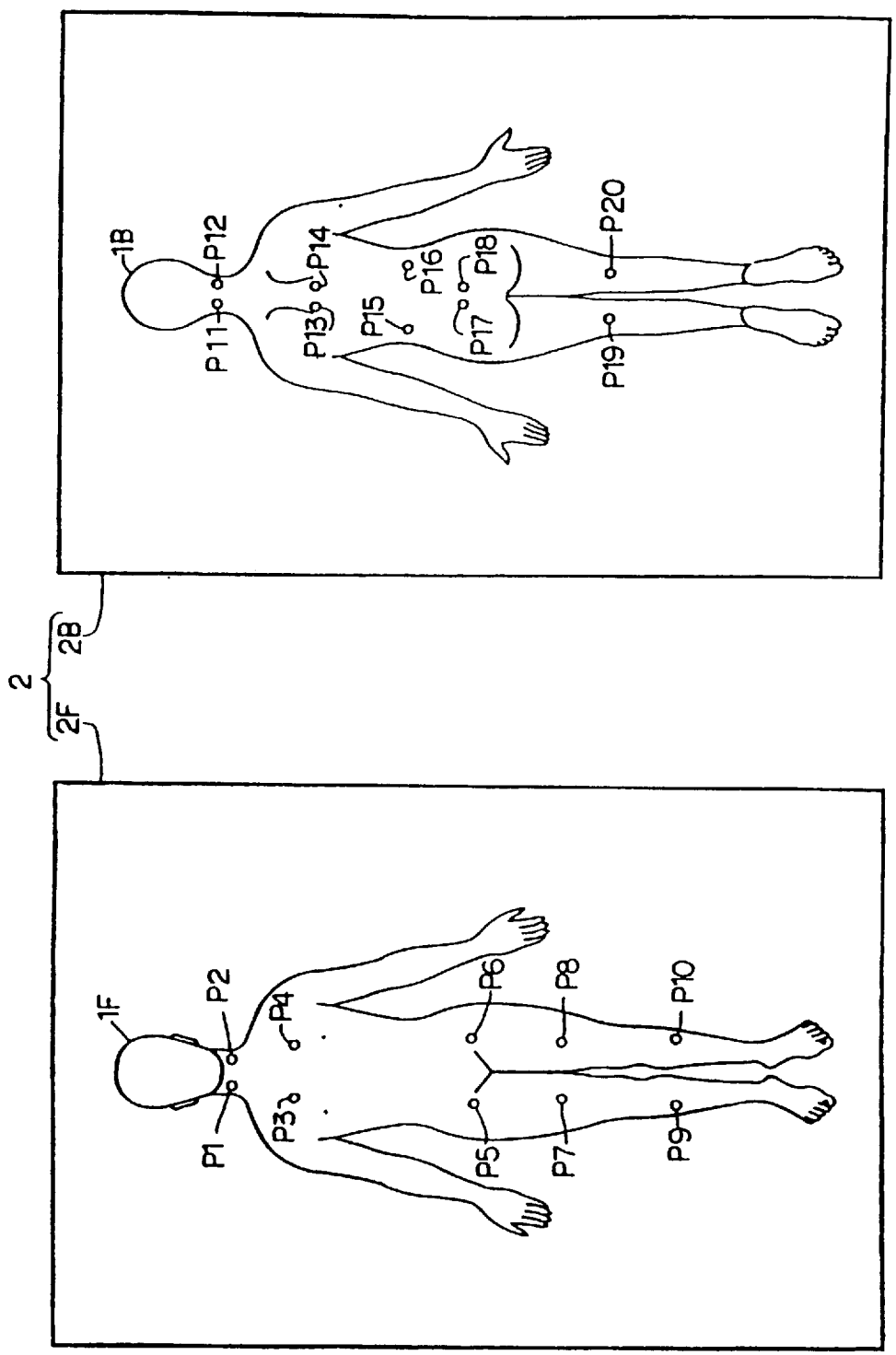
FIG. 1 is an illustration of the preferred embodiment of a chart for inspection of tender points according to the present invention.

Next, the preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscuring of the present invention.

As is well known, there is a method for treatment of diseases focusing on natural alignment of skeleton of human body. One such treatment method is "Kinkeitai treatment". In the Kinkeitai treatment, it is considered that the cause of human diseases is non-alignment or non-parallel tilt of the skeleton.

Examples of such diseases are local diseases, such as lambego, knee joint pain, shoulder joint pain, cervicobrachial syndrome, headache and so forth, pain, numbing, paralysis, stiffness and so forth due to vertebra central neuropathy, peripheral neuropathy of the whole body. These diseases can cause functional diseases viscera, such as diseases in respiratory system, such as asthma, bronchitis, habitus easily catching a cold and so forth, heart diseases, e.g. myocardial infraction, heart attack, heart failure and so forth, or diseases of cardiovascular system, such as high blood pressure, low blood pressure and so forth.

Also, alimentotherapy and urinary system, such as gastrointestinal diseases, diarrhea, constipation, pollaki, cystitis, liver diseases, painful menstruation, curse irregularity and so forth.

Under the premise that the above-mentioned diseases are caused by non-parallel tilt of the skeleton of the human body, the present invention is to recover contracture and local concentration of the contracture in the muscular apparatus supporting the skeleton. Through the treatment of the present invention, the human skeleton is restored into the natural alignment state to cure the diseases. Effect of this way of treatment has been proven by a large number of clinical examples.

Here, when the skeleton of the human body causes non-parallel tilt or non-alignment, various skeleton tilting direction types are present in respective of individual human body. For example, the vertebra is tilted to convexing toward right or left or in S-shaped configuration. Also, hip portion is ascended toward right or left, or shoulder portion is ascended toward right or left.

As kinds of skeleton tilting direction types, basic type of right side muscular apparatus, basic type of left side muscular apparatus, right side muscular apparatus S1 type, right side muscular apparatus S2 type, right side muscular apparatus S3 type, left side muscular apparatus S1 type, left side muscular apparatus S2 type, left side muscular apparatus S3 type as mixing type of left and right side muscular apparatus can be listed. The name of the skeleton tilting direction types are grouping the skeleton tilting condition common to the patients complaining for the similar symptom for convenience of disclosure. Therefore, the naming per se is nothing specific for the claimed invention.

Manual treatment to be performed for the patients depending upon the type of the skeleton tilting direction. Accordingly, in advance of treatment, it becomes necessary to measure the non-alignment characteristics and the skeleton tilting direction type of the diseases of the patient.

For achieving the task of the invention, the present invention is constructed as follows. Namely, the preferred embodiment is constituted of a plurality of tender point inspecting chart 2 having a human body chart 1 representing the human body, and tender point inspecting point group consisted of a plurality of tender point inspection points P1, P2, P3, . . . P20 provided on the human body chart 1, and a skeleton tilting direction pattern chart 4 having a human body chart 3, a tender point pattern consisted of a plurality of tender point designating points Q1. Q2. Q3, . . . Q20 among the render point designating point Q given on the human body chart 3, muscular apparatus A representative of the form of presence of the muscular apparatus corresponding to each individual skeleton tilting direction type and symptom pattern indicative of position and form of symptom corresponding to the muscular apparatus A.

The tender point inspection chart 2 comprises a front side tender point inspection chart 2F with a front side human body chart 1F representing the front side of the human body and a back side tender point inspection chart 2B with a back side human body chart 1B representing the back side of the human body.

The front side tender point inspection chart 2F is given ten tender point inspecting points P1, P2, P3, . . . P at respective positions of left and right sides of neck portion, left and right sides of breast portion, left and right sides of groin, left and right sides of thigh and left and right sides of leg.

Namely, the tender point inspecting points P1, P2, P3, . . . P are given symmetrically at left and right sides on the human body chart to form the tender point inspecting point group. It should be noted that throughout the disclosure, the reference for left and right is made as left and right sides of the human body.

While the back side tender point inspection chart 2B is formed substantially similar manner to that of the front side tender point inspection chart 2F. However, in the back side tender point inspection chart 2B, ten tender point inspecting points P1, P12, P13, . . . P20 are given at left and right sides of the neck portion, left and right sides of scapula portion, left and right sides of hip portion, left and right sides of ilioscaral joint and left and right sides of poples portion.

Similarly, the skeleton tilting direction pattern chart 4 also comprises a front side skeleton tilting direction pattern chart 4F with a front side human body chart 3F representative of the front side of the human body similarly to the front side tender point inspection chart 2F, and a back side skeleton tilting direction pattern chart 4B with a back side human body chart 3B representative of the back side of the human body.

The skeleton tilting direction pattern chart 4 includes a skeleton tilting direction pattern chart 4a corresponding to the basic type of right side muscular apparatus, a skeleton tilting direction pattern chart 4b corresponding to the basic type of left side muscular apparatus, a skeleton tilting direction pattern chart 4c corresponding to S1 type of the right side muscular, a skeleton tiling direction pattern chart 4d corresponding to S1 type of the left side muscular apparatus, a skeleton tilting direction pattern chart 4e corresponding to S2 type of the right side muscular, a skeleton tilting direction pattern chart 4f corresponding to S2 a skeleton tilting direction pattern chart 4g corresponding to S3 type of the right side muscular, a skeleton tilting direction pattern chart 4h corresponding to S3 type of the left side muscular apparatus, type of the left side muscular apparatus, a skeleton tilting direction pattern chart 4i corresponding to worse symptom of the basic type of the right side muscular apparatus, and a skeleton tilting direction pattern chart 4j corresponding to worse symptom of the basic type of the left side muscular apparatus.

Here, for convenience of disclosure, tender point designating points Q1, Q2, Q3, . . . Q10, Q11, Q12, . . . Q20 given on the front side human body chart 3F and the back side human body chart 3B of the front side skeleton tilting direction pattern chart 4F and the back side skeleton tilting direction pattern chart 4B substantially correspond to respective of the tender point inspecting points P1, P2, P3, . . . P, P11, P12, . . . P20 given on the front side tender point inspection chart 2F and the back side tender point inspection chart 2B.

Figure 2:
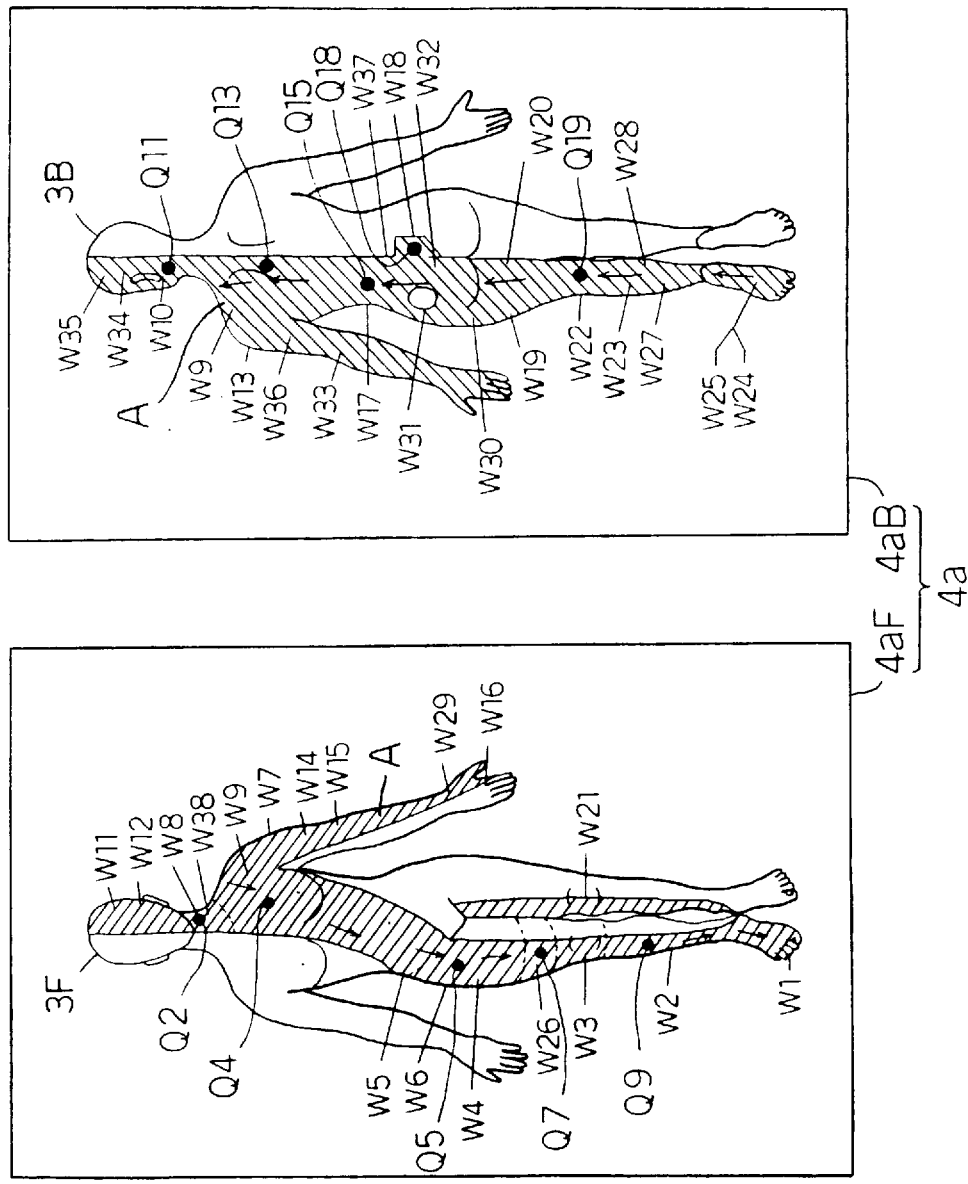
FIG. 2 is an illustration showing a basic form of right side muscular apparatus in Kinkeitai treatment in the preferred embodiment of chart of a skeleton tilting direction pattern of the present invention.
Figure 3:
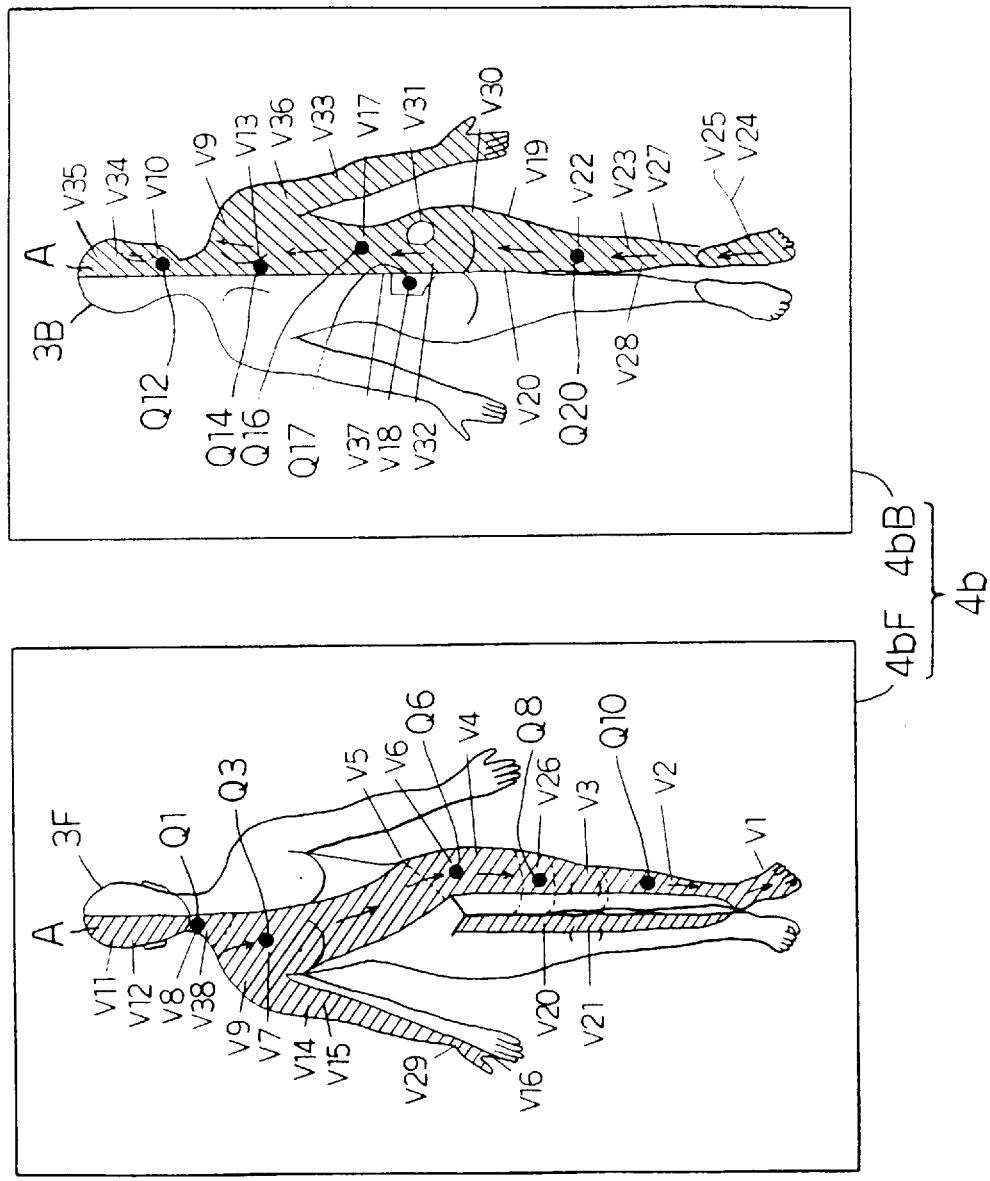
FIG. 3 is an illustration showing a basic form of left side muscular apparatus in Kinkeitai treatment in the preferred embodiment of chart of a skeleton tilting direction pattern of the present invention.

Namely, explaining with the front side skeleton tilting direction pattern chart 4aF among the skeleton tilting direction pattern chart 4a shown in FIG. 2, for example, in the front side skeleton tilting direction pattern chart 4aF, the tender point designating point Q2 is positioned at left side of neck portion, the tender point designating point Q4 is positioned at left side of breast portion, the tender point designating point Q5 is positioned at right side of groin, the tender point designating point Q7 is positioned at right side of thigh and the tender point designating point Q9 is positioned at right side of leg. With these tender point designating points Q2, Q4, Q5, Q7 and Q9, the tender point pattern is formed. For other skeleton tilting direction pattern charts, the tender point pattern are formed in substantially the same manner.

Next, symptoms common to the basic type of the right side muscular apparatus are listed below with reference to FIG. 2: right foot back pollex pain W1, right lateral lower leg pain W2, right anterior and lateral knee pain W3, anterior and lateral femur pain W4, right lateral iliac crest pain W5, right groin pain W6, right lower abdomen pain and left intercostal pain W7, left lateral cerical pain W8, left shoulder joint pain W9, left frozen shoulder, left postro-lateral cerical pain W10, left migvaine W11, left faial nerve pain W12, left interscapulla pain W13, left lateral arm pain W14, left arm numbness W15, left digilal pain W16, left lumbus muscle pain W17, right ilio-sacral joint pain W18, left postero-lateral femur pain W19, left medial femur pain W20, left medial knee pain W21, left poplsteal pain W22, left calf pain W23, left foot bottom numbness W24, easy to exhaust and left foot bottom pain W25, right anterior femur convulsions, left Wadenkrampf W27, left tension of Ackill lender, left wrist pain W29, left gluteal medio-lateral pain W31, left gluteal lateral pain W32, left elfon joint pain W33, left occipital pain W35, left postere-lateral arm pain W36 and so forth.

On the other hand, as diseases the followings are listed: pneumonia, atopic dermatitis, hay fever, chronic rhinitis, empyema, bronchitis, asthma, cardiac infarction, palpitation, angina, heart failure, left ear deafness, cold, right lumber-disc herniation, esophagitis W38, right lumber-disc herniation W39, left sciatic pain W30, painful menstruation W41, asthma W42, heart failure W43, cardiac infarction W44, curse irregularity, gynecology disease, constipation W40, hemorrhoid, constitution easy to catch cold and so forth.

Figure 10:
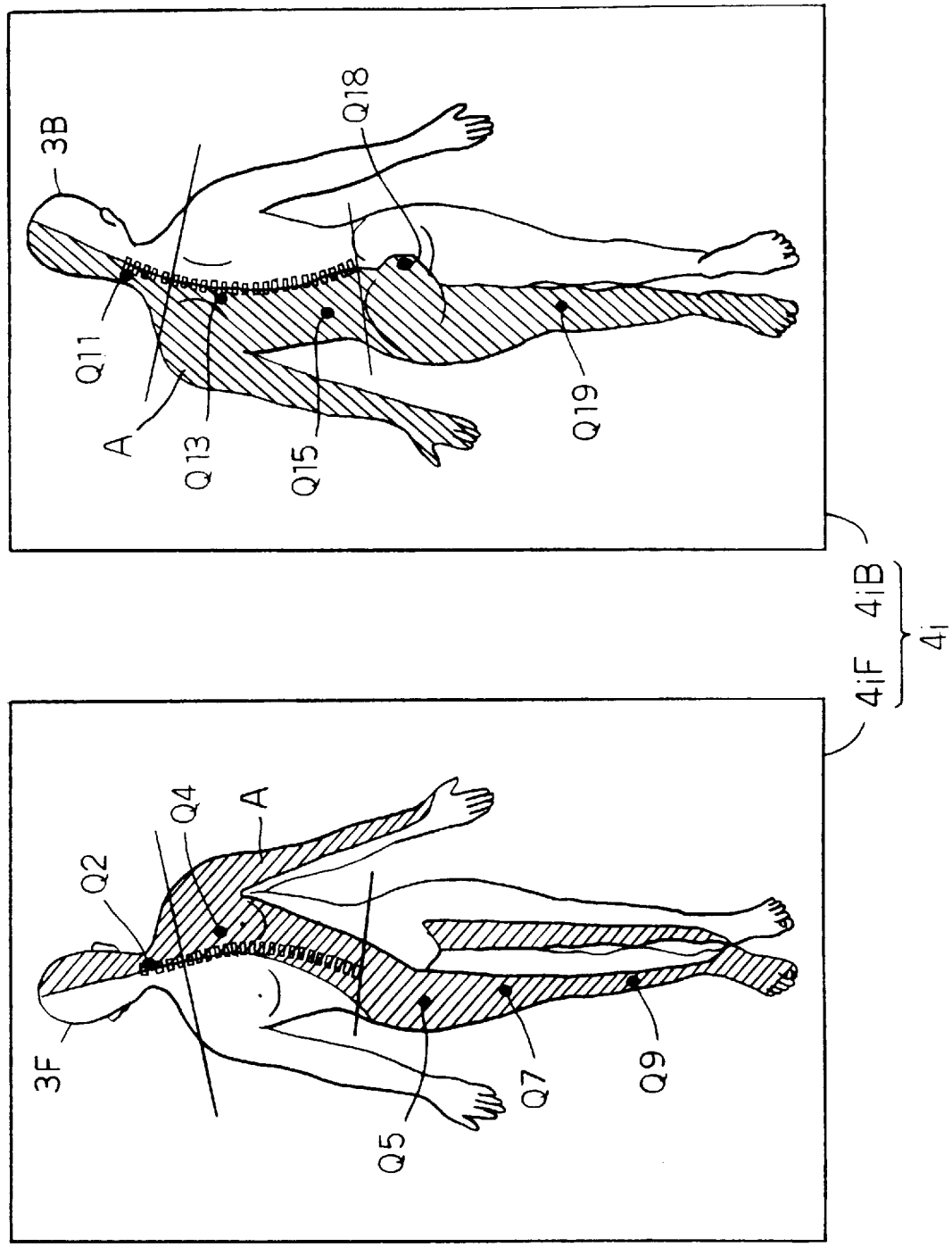
FIG. 10 is an illustration of the preferred embodiment of the skeleton tiling direction pattern chart, showing a worse symptom of the basic type of the right side muscular apparatus in the Kinkeitai treatment.

Then, when the symptom gets worse in the basic type of the right muscular apparatus, tilting direction of the skeleton shown in FIG. 10 appears. Namely, at the upper body, right side pelvis ascends and the lumber is tilted to convex toward left, the right side shoulder descends, and head is inclined toward right. On the other hand, left shoulder ascends, the left pelvis descends. On the other hand, in the lower body, the right hip joint ascends, right knee and right toe are directed toward outside. Also, the left hip joint descends and left knee and left toe are directed toward inside.

Symptoms common to the basic type of the left side muscular apparatus are listed below with reference to FIG. 2: left foot back pollex pain V1, left lateral lower leg pain V2, left anterior and lateral knee pain V3, left anterior and lateral femur pain V4, left lateral iliac crest pain V5, left groin pain V6, left lower abdomen pain and right intercostal pain V7, right lateral cerical pain V8, right shoulder joint pain V9, right postro-lateral cerical pain V10, right frozen shoulder, right migvaine V11, right faial nerve pain V12, right interscapulla pain V13, right lateral arm pain V14, right arm numbness V15, right digilal pain V16, right lumbus muscle pain V17, left ilio-sacral joint pain V18, right postero-lateral femur pain V19, right medial femur pain V20, right medial knee pain V21, right poplsteal pain V22, right calf pain V23, right foot bottom numbness V24, easy to exhaust and right foot bottom pain V25, left anterior femur convulsions, right Wadenkrampf V27, right tension of Ackill lender, right wrist pain V29, right gluteal medio-lateral pain V31, right gluteal lateral pain V32, right elfon joint pain V33, right occipital pain V35, right postere-lateral arm pain V36 and so forth.

On the other hand, as diseases, gastric ulcer V45, duodenal uler, diarrhea V46, constipation V40, cystitis, pollakisuria, liver diseases, diabetes, right ear deafness V34, left lumber-disc herniation V37, esophagitis V38, left lumber-disc herniation V39, right sciatic pain, painful menstruation, curse irregularity, gynecology diseases, stomatitis, hemorrhoid, constitution of easily cause alimentotherapy diseases and so forth.

Figure 11:
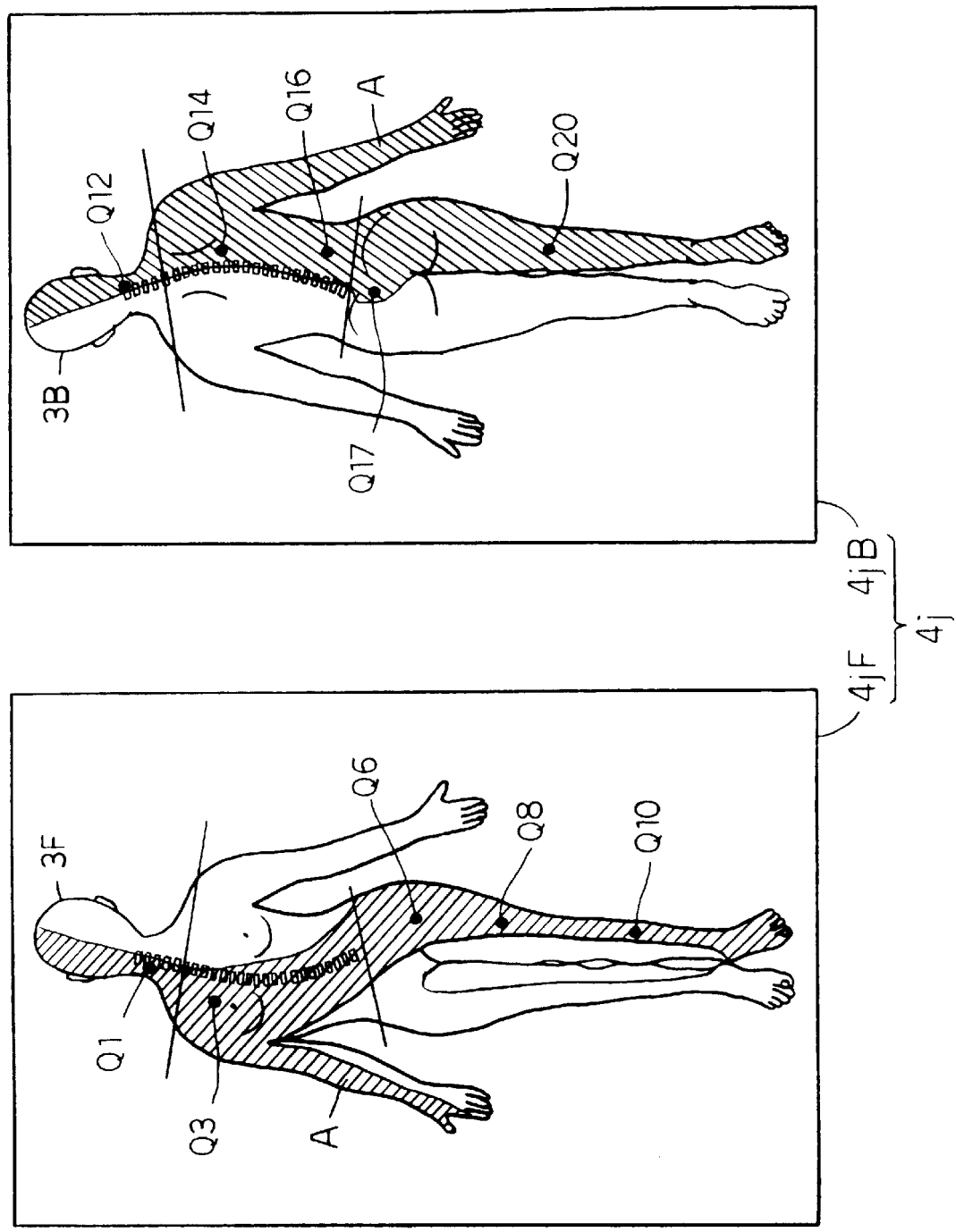
FIG. 11 is an illustration of the preferred embodiment of the skeleton tilting direction pattern chart, showing a worse symptom of the basic type of the left side muscular apparatus in the Kinkeitai treatment.

When the symptom gets worse in the basic type of the left muscular apparatus, tilting direction of the skeleton shown in FIG. 11 appears. Namely, at the upper body, left side pelvis ascends and the lumber is tilted to convex toward right, the left side shoulder descends, and head is inclined toward left. On the other hand, right shoulder ascends, the right pelvis descends. On the other hand, in the lower body, the left hip joint ascends, left knee and left toe are directed toward outside. Also, the right hip joint descends and right knee and right toe are directed toward inside.

Figure 4:
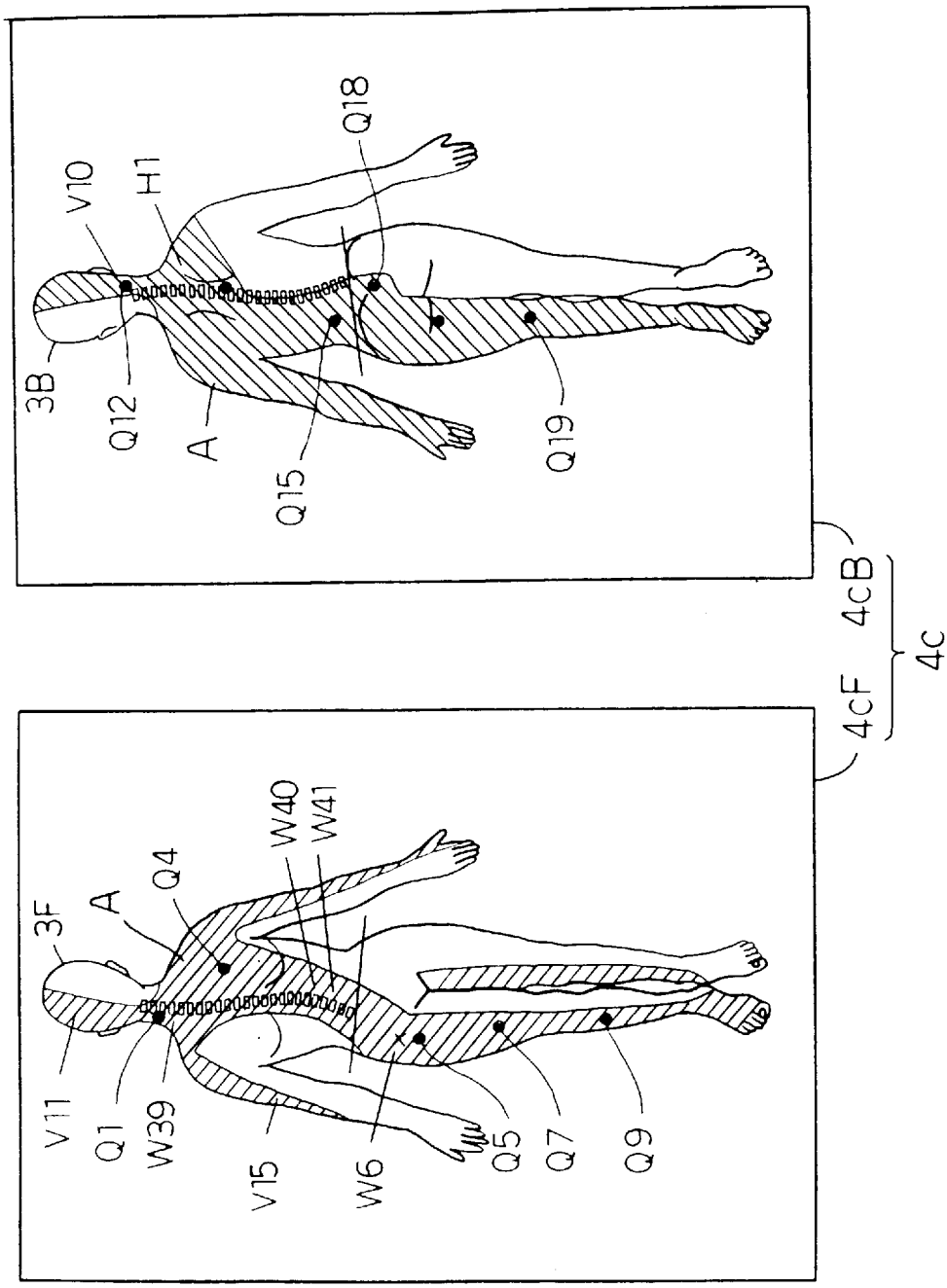
FIG. 4 is an illustration of the preferred embodiment of the skeleton tilting direction pattern chart according to the invention, in which is shown a skeleton having S1 type tilting tendency in the right side muscular apparatus.

Next, S1 type of right muscular apparatus will be discussed with reference to FIG. 4. The S1 type of the right side muscular apparatus is the case mainly caused due to abnormality of cervical spine, such as cervical disc herniation W39 or cervical compression fracture. Contracture presents in femur straight muscle. Pain at the groin is caused by hip joint controlling nerve associated with rotation of the pelvis. It should be noted that H1 is stiffness of right shoulder.

Figure 5:
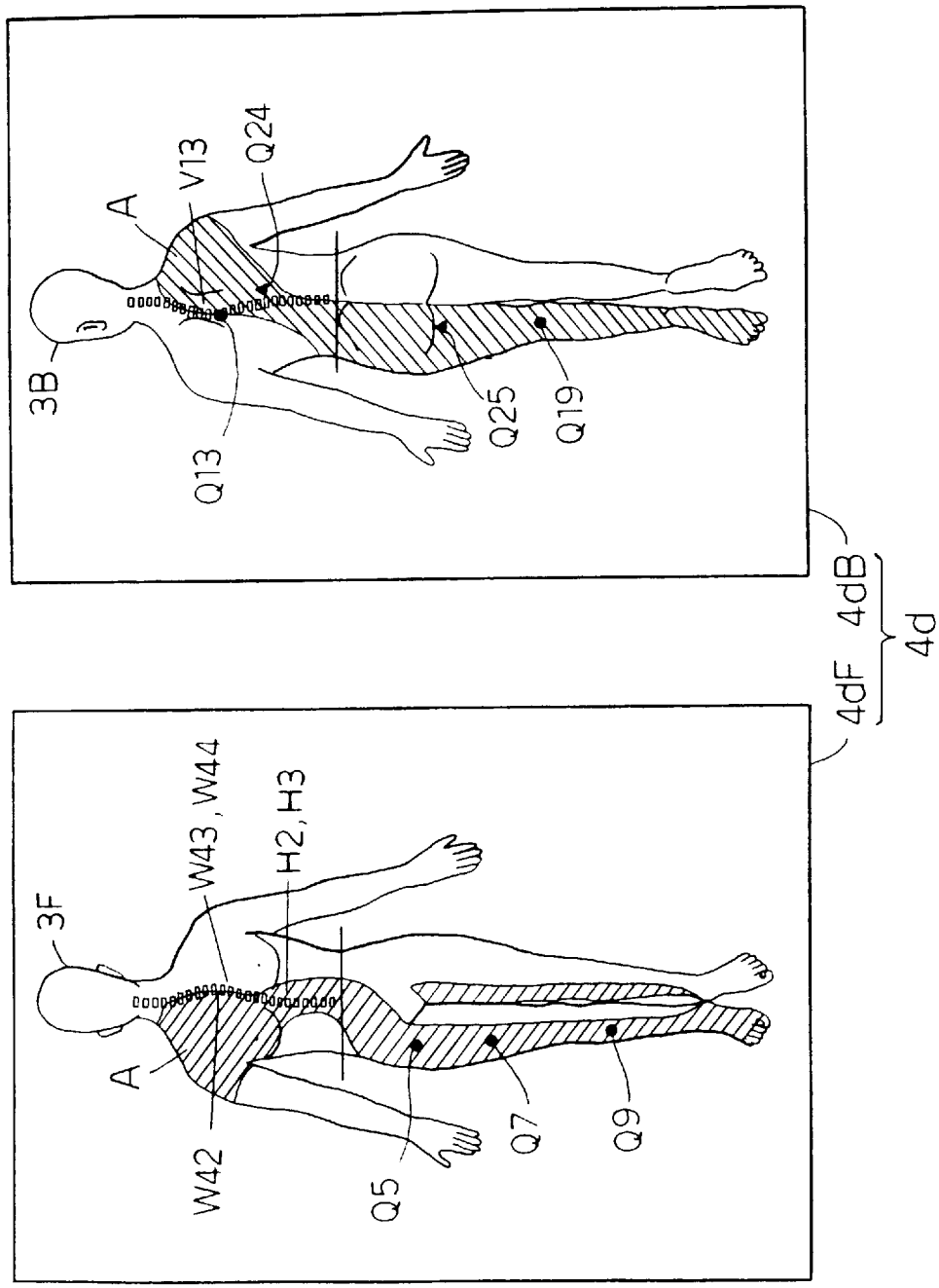
FIG. 5 is an illustration of the preferred embodiment of the skeleton tilting direction pattern chart according to the invention, in which is shown a skeleton having S2 type tilting tendency in the right side muscular apparatus.
Figure 8:
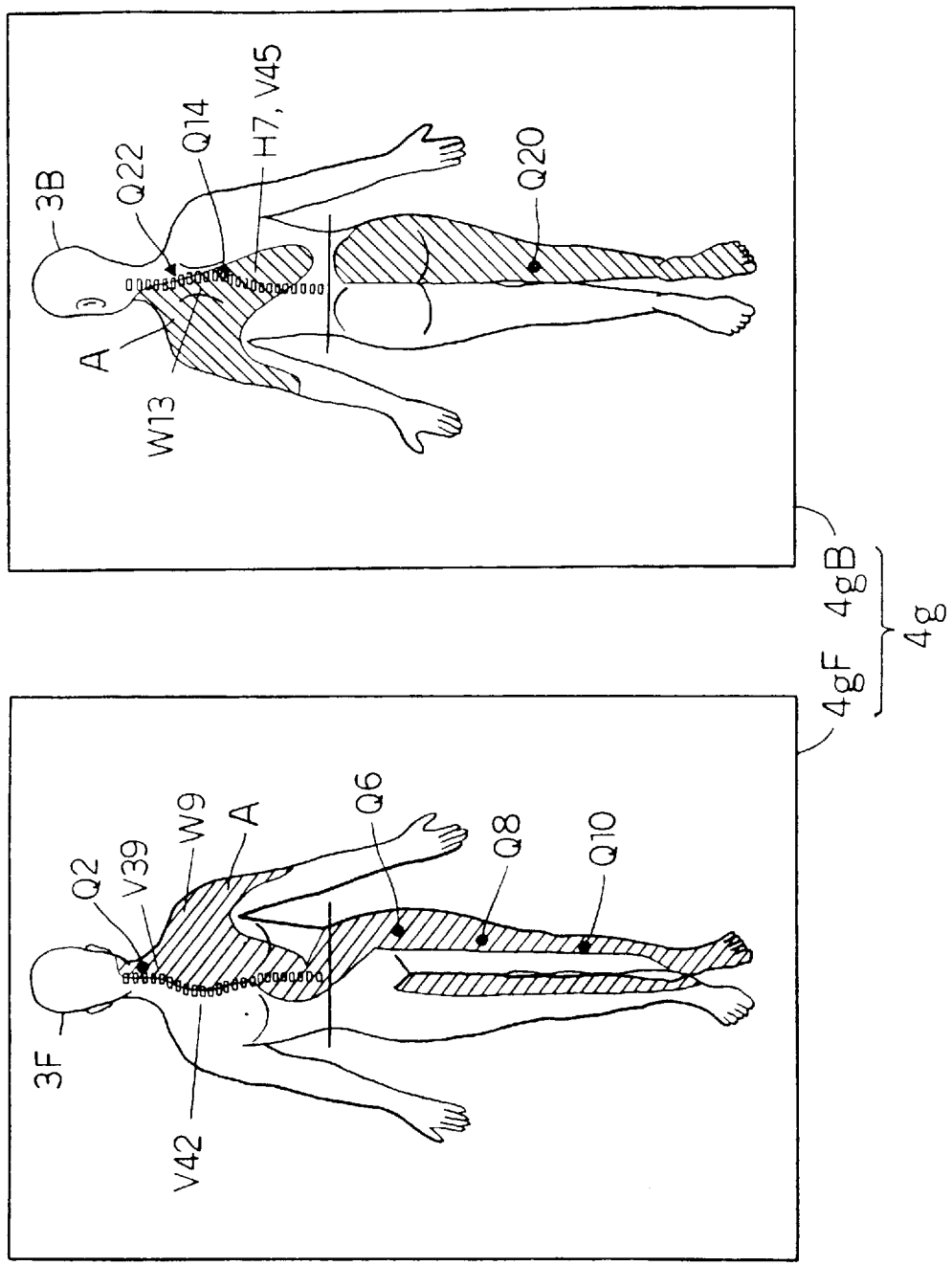
FIG. 8 is an illustration of the preferred embodiment of the skeleton tilting direction pattern chart according to the invention, in which is shown a skeleton having S2 type tilting tendency in the right side muscular apparatus.
Figure 9:
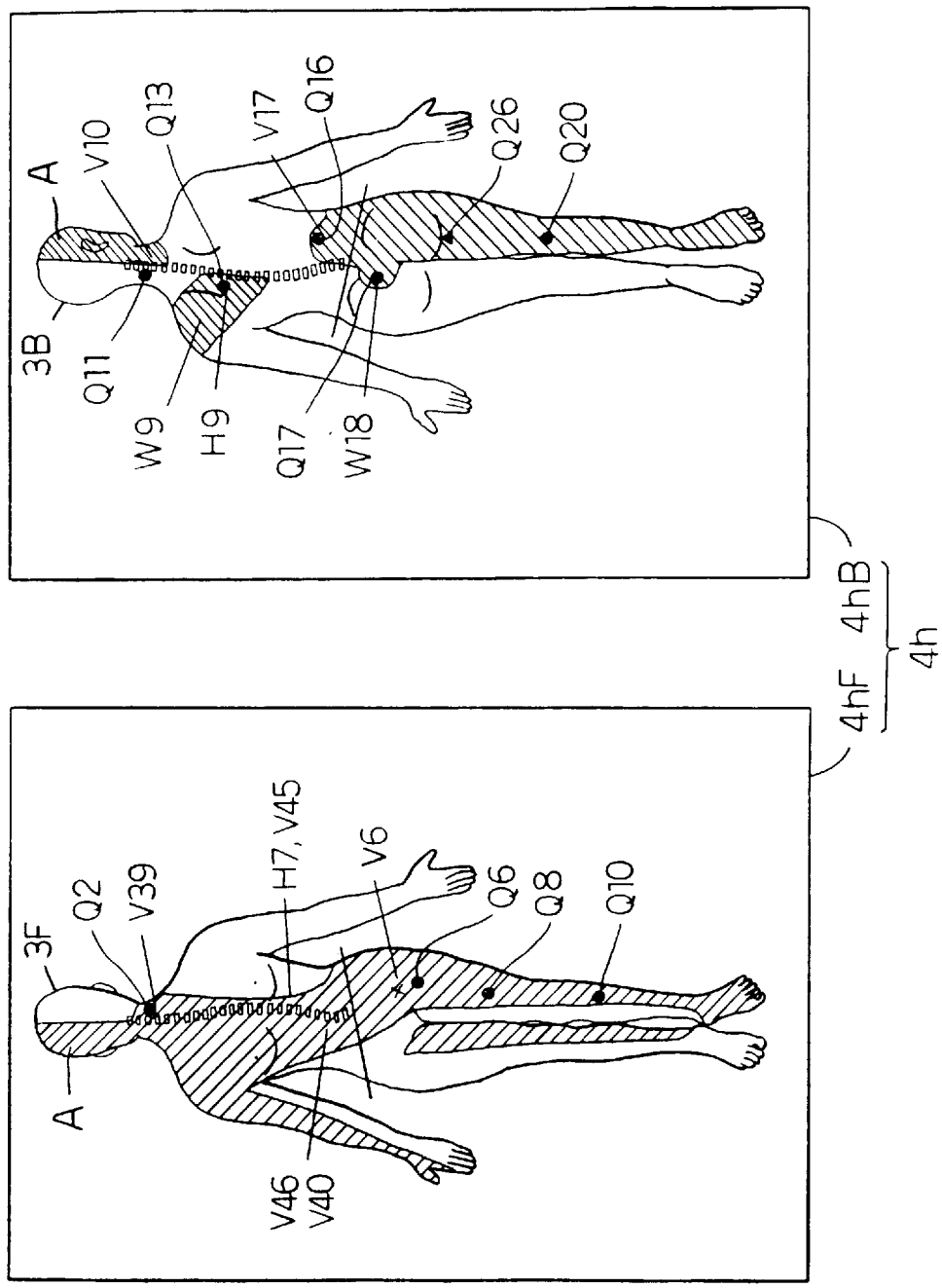
FIG. 9 is an illustration of the preferred embodiment of the skeleton tilting direction pattern chart according to the invention, in which is shown a skeleton having S3 type tilting tendency in the right side muscular apparatus.

Next, S2 type of the right muscular apparatus will be discussed with reference to FIG. 5. The right muscular apparatus S2 type is the case where pelvis is oriented horizontally and thus in the normal state. When abnormal vertical alignment or non-parallel alignment of the connecting faces of the bones are caused due to slight non-parallel tilt is caused in the vertebra or so forth, symptom of diseases appears locally. When abnormal vertical alignment is caused in thoracic vertebra Nos. 3, 4, 5 or 6, asthma W42, heart failure W43, angina or right inter-scapula pain can be caused. Also, in case that the abnormal vertical alignment is caused in thoracic vertebra Nos. 12, 1 or 2, alimentotherapy can be caused. It should be noted that non-parallel alignment at H2 may cause weak stomach and at H3 may cause lose of appetite. On the other hand, in FIG. 5, the tender point designating point Q24 and the tender point designating point Q25 are particular tender point designating point to be included in the S1 type left muscular apparatus, which are discriminated by mark "▼" whereas the tender point designating points Q corresponding to the tender point inspecting points P are represented by "●". The tender point designating point Q24 in FIG. 24, the tender point designating point Q22 in FIG. 7, the tender point designating point Q22 in FIG. 8 and the tender point designating point Q26 in FIG. 9 show similar particular tender point designating point to be included in the muscular apparatus types.

Figure 6:
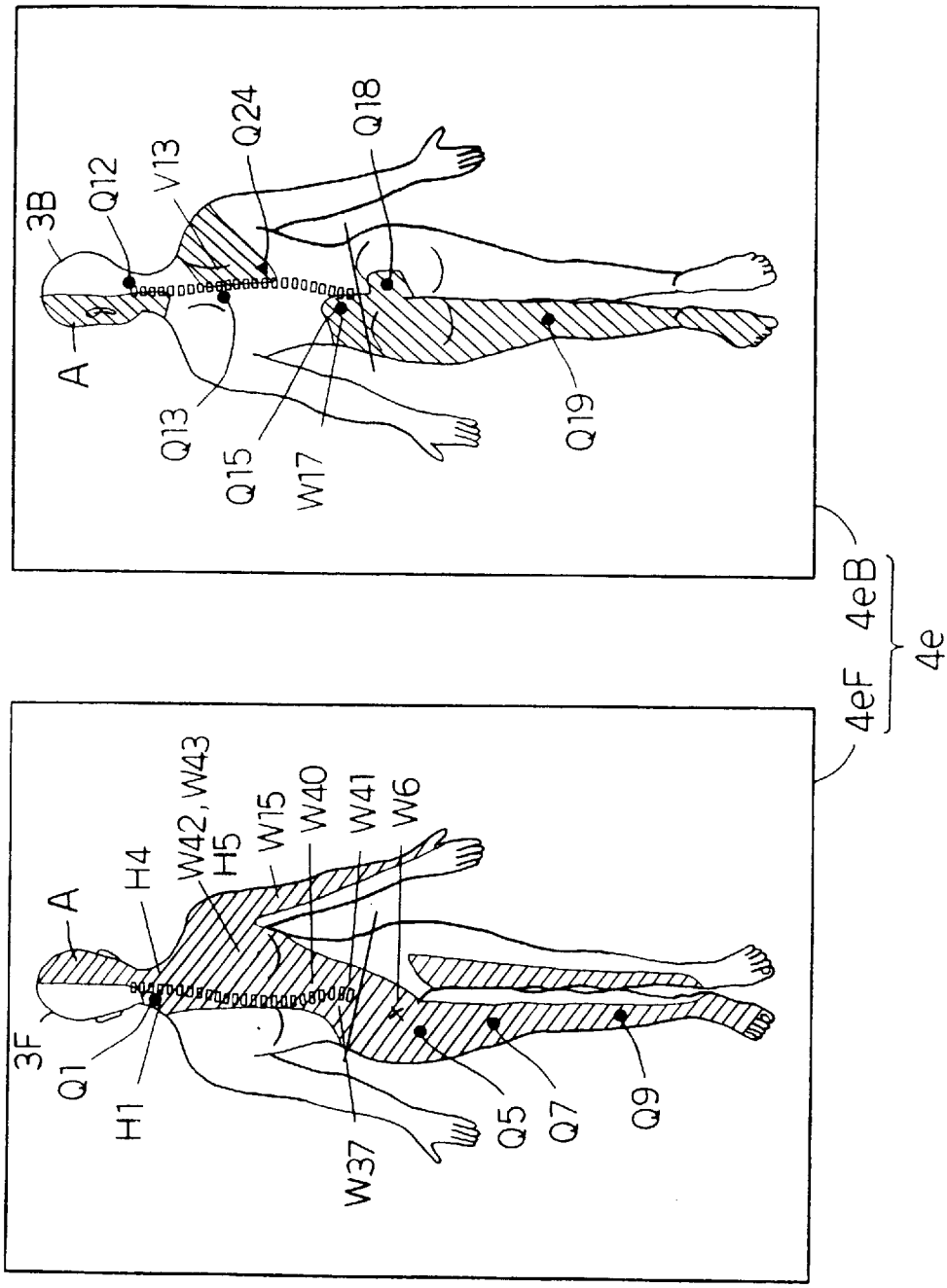
FIG. 6 is an illustration of the preferred embodiment of the skeleton tilting direction pattern chart according to the invention, in which is shown a skeleton having S3 type tilting tendency in the right side muscular apparatus.

Next, S3 type of the right muscular apparatus will be discussed hereinafter with reference to FIG. 6. The right muscular apparatus S3 type is the case where the pelvis is tiltingly twisted toward right or left and is considered as a cause of painful menstruation W41, gynecological diseases. When the right side pelvis is lifted up, the connecting faces of the vertebra becomes asymmetric or non-parallel alignment should cause gynecological diseases and right lumber-disc herniation V37. It should be noted that H4 represents stiffness of left shoulder and H5 represents palpitation.

Figure 7:
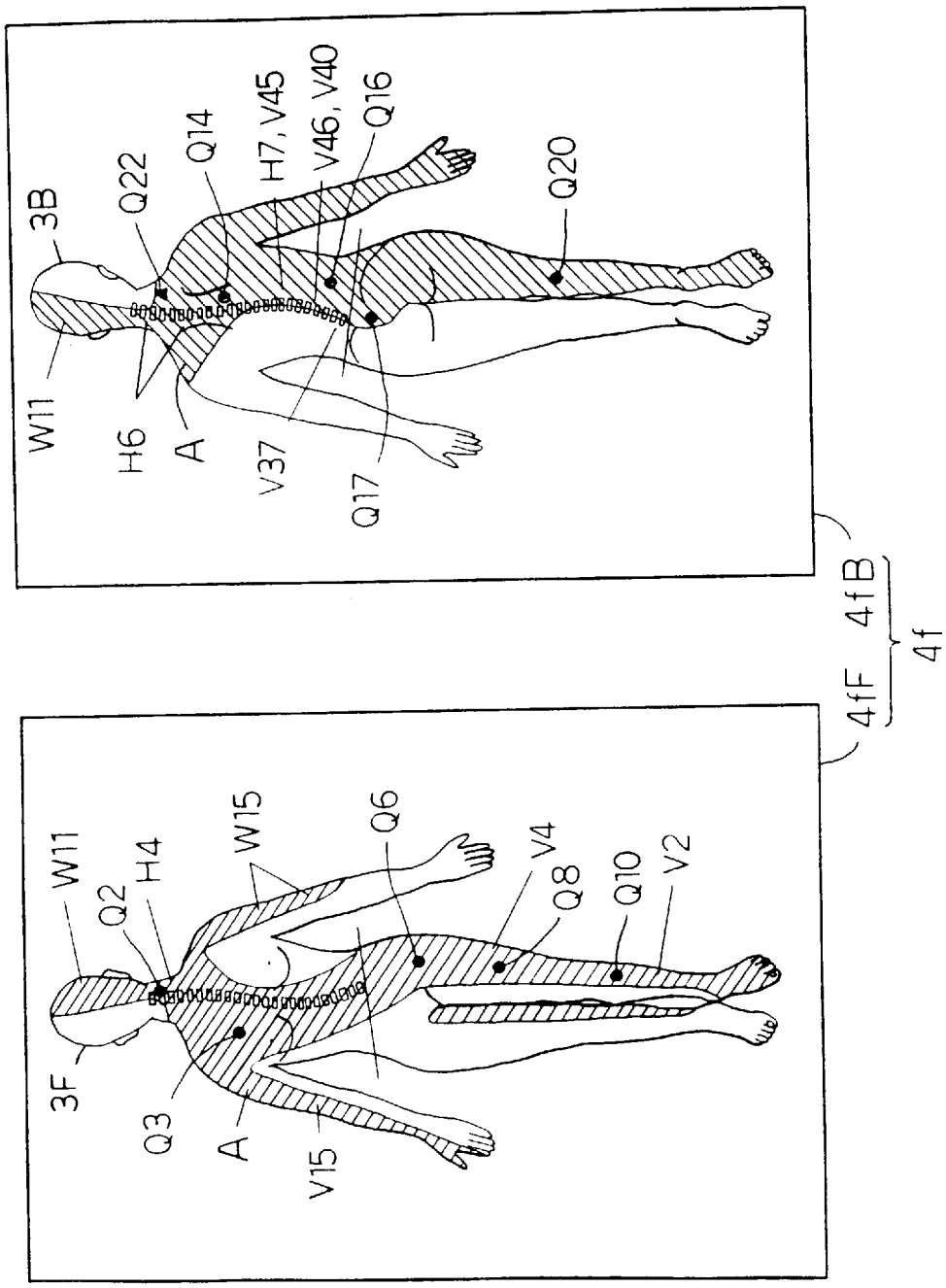
FIG. 7 is an illustration of the preferred embodiment of the skeleton tilting direction pattern chart according to the invention, in which is shown a skeleton having S1 type tilting tendency in the left side muscular apparatus.

The S1 type of left muscular apparatus will be discussed hereinafter with reference to FIG. 7. The left muscular apparatus S1 type is a complicated symptom of diseases of the left lumber-disc herniation V37 and abnormality of cervical spin. Basically, this causes right side sick headache V11. However, when cervicobrachia syndrome is present in the cervical spin, left side sick headache W1 can be caused frequently. It should be noted that H6 represents left cervicobrachial syndrome and H7 represents gastritis.

Next, the S2 type of the left muscular apparatus will be discussed with reference to FIG. 8. The left muscular apparatus S2 type is the case where thoracic vertebra Nos. 2, 3, 4 or 5 cases non-parallel tilt convexing toward right to cause abnormal vertical alignment of the connecting face. In such case, it is possible to cause asthma, but possibility to cause heart disease is low.

Next, S3 type of the left muscular apparatus will be discussed with reference to FIG. 9. The left muscular apparatus S3 type cases ilio-sacral joint pain W18 and left inter vertebra-disc herniation V39. In this case, separation is caused in the ilio-sacral joint and the connecting faces of the vertebra become non-parallel alignment. It should be noted that H9 represents lateral left thoracic vertebra pain.

In the charts of the left and right muscular apparatus as set forth above, asthma, painful menstruation, irregular menstruation, gynecological disease, constipation, hemorrhoid appears in both of the left and right muscular apparatus. Accordingly, these symptom cannot be critical reference, basically. However, asthma is frequently caused in the right muscular apparatus, and painful menstruation, irregular menstruation, gynecological disease, constipation are frequently caused in the left muscular apparatus. These are caused depending upon portion of local non-parallel alignment of the vertebra or twisting of pelvis and twisting angle due to abnormal tension, contracture and local concentration of muscles. Particularly, there are exceptions in the organ body and the symptom of the diseases, while it is possible to generally separate to left and right, it is not possible to uniformly determine to be left or right.

With the construction set forth above, measurement of the non-alignment characteristics and tilting direction type of a skeleton of the subject of inspection is performed as follows. It should be noted that the following discussion will be given with respect to the front side of the human body with reference to FIGS. 12A to 12D.

At first, respective portion of the body of the subject of inspection corresponding to respective tender point inspecting points P shown in the front side tender point inspection chart 2F are depressed for seeking tender point or points. At this time, the tester inquires to the subject of inspection with depressing each tender point inspecting point if the depression causes pain or not. If the subject of inspection answers "YES", the currently depressed point is determined as the tender point. Therefore, the subject of inspection is not required to express the condition of own disease and the body condition in the daily lift and so forth but is required to simply answer by "YES" or "NO".

Therefor, the subject of inspection may easily give accurate information concerning own symptom of diseases to the tester. Next, the detected tender points among the tender point inspecting points P are taken as inspected tender points P'. In the shown example, the inspected tender points are illustrated by adding mark "x" on the relevant tender point testing points to establish the inspected tender point P'. Namely, among the tender point inspecting points P, by giving mark "x" on the tender point inspecting point P1, the inspected tender point P1' is established, and by giving mark "x" on the tender point inspecting point P2, the inspected tender point P2' is established. In the similar manner, by giving the mark "x" for respective tender point inspecting points P3, P4, P5, . . . P20, the inspected tender points P3', P4', P5', . . . P20' are established. Namely, in case of FIG. 12B, the inspected tender points P1', P4', P5', P7', P9' are established.

At this time, observing the inspected tender points P1', P4', P5', P7', P9', the "x" is not given for the tender point inspecting point P2 located at the left side of the inspected tender point P1'. Similarly, the "x" is not given for the tender point inspecting point P3 located at the right side of the inspected tender point P4'. Also, the "x" is not given for the tender point inspecting point P6 located at the left side of the inspected tender point P5'. Furthermore, the "x" is not given for the tender point inspecting points P8 and P10 respectively located at the left sides of the inspected tender points P7' and P9'. Therefore, the inspected tender points P1', P4', P5', P7', P9' cannot be symmetric with respect to the center line of the body. Thus, judgement can be made that the skeleton of the body of the subject of inspection is causing non-parallel tilt. The distribution of the inspected tender points P1', P4', P5', P7', P9' is referred to as inspected tender point pattern.

Figure 12:
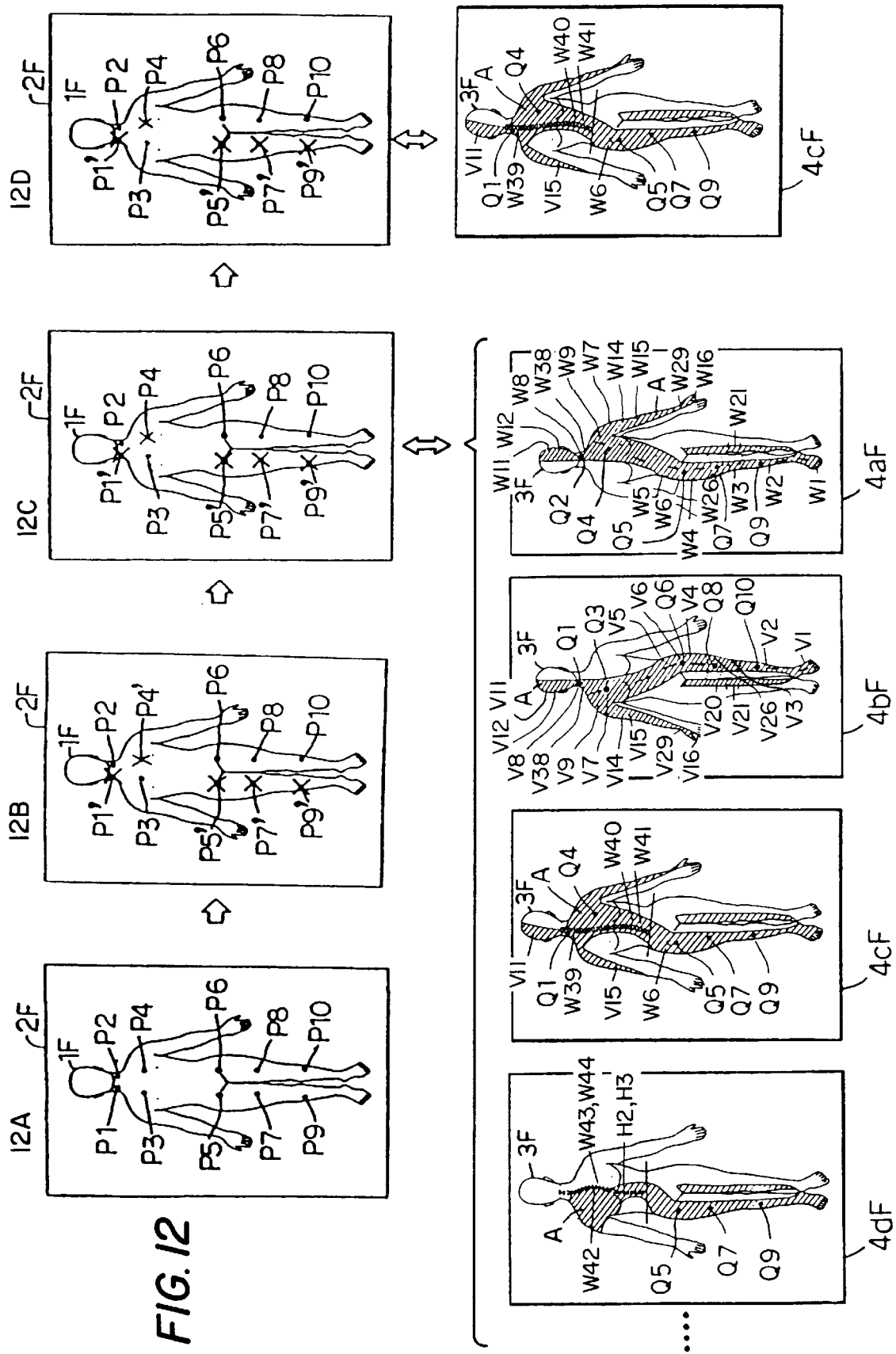
FIGS. 12A to 12D are illustrations showing a process for measurement of the skeleton non-alignment characteristics and the skeleton tilting direction type of a subject of inspection in the shown embodiment of the invention.

Next, among the tilting direction pattern charts 4aF, 4bF, 4cF, . . . 4jF as shown in FIG. 12C, a pattern having tender point distribution pattern approximately matching with the inspected tender point pattern is selected. In the shown case, the tilting direction pattern chart 4cF corresponding to the S1 type of the right muscular apparatus is approximately consistent with the obtained inspected tender point pattern. Thus, according to FIG. 12D, judgement can be made that the subject of inspections tilting direction type is S1 type of right muscular apparatus. Once the tilting direction pattern of the subject of inspection can be determined, a region where symptom of disease appears, namely the muscular apparatus A can be determined. Then, on the basis of the position and distribution pattern of the inspected tender points appearing in the case of the muscular apparatus A, a symptom pattern of the subject of inspection's disease can be determined. The symptom pattern of the disease thus determined, provides helpful information in subsequent treatment. As set forth above, by the tender points, the non-alignment tilt characteristics and the tilt direction type of the subject of inspection can be determined.

Here, among people included in one of particular tilting direction type among a plurality of the tilting direction types, the portions where the tender points are present, it is possible that the location of the tender points are slightly differentiated per each individual subject of inspection. Accordingly, it is possible that the inspected tender point pattern is not completely consistent with the tender point pattern in the particular tilting direction type. Therefore, the tilting direction type having tender point pattern approximately corresponding to the inspected tender point pattern is taken as the tilting direction type of the subject of inspection. It should be appreciated that by setting greater number of the tilting direction types, selection of the tender point pattern matching with the inspected tender point pattern of the subject of inspection is facilitated to make it easier to accurately determine the tilting direction type of the subject of inspection.

Figure 13A:
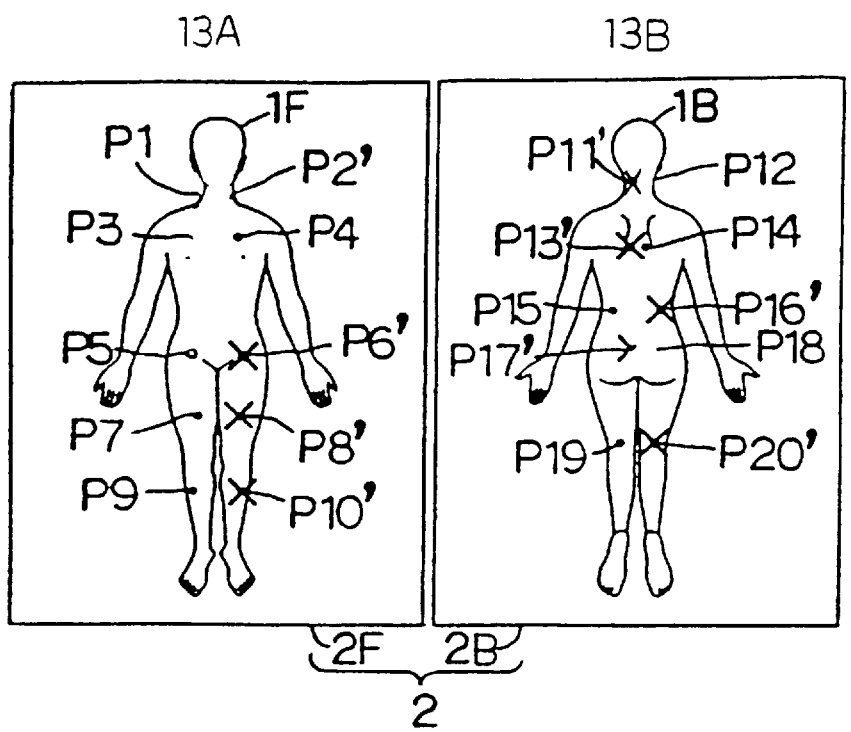
FIGS. 13a (A and B) and 13b (C and D) are illustrations showing a chart for inspecting a tender point and the skeleton tilting direction pattern chart for another subject of inspection different from the subject of inspection of FIG. 12.

Next, discussion will be given for another example of the inspected tender point pattern with reference to FIGS. 13a (A and B) and 13b (C and D). At first, as shown in FIG. 13a, A, the inspected tender points P2', P6', P8' and P10' are established in the front side tender point inspection chart 2F. On the other hand, as shown in FIG. 13a, B, the inspected tender points P11', P13', P16', P17' and P20' are established in the back side tender point inspection chart 2B. Accordingly, both of the inspected tender point patterns in the front side tender point inspection chart 2F and the back side tender point inspection chart 2B are not symmetric. Therefore, judgement can be made that the skeleton causes non-parallel tilt.

Then, the inspected tender point patterns shown in FIGS. 13a, A and B, are approximately matched with the tender point patterns of the tilting direction pattern charts 4hF and 4hB corresponding to the S3 type of left muscular apparatus shown in FIGS. 13b (C and D) and 13D. Therefore, judgement can be made that the subject of inspection's body is not in normal alignment but causes non-parallel tilt in the pattern of the S3 type of the left muscular apparatus.

Figure 14A:
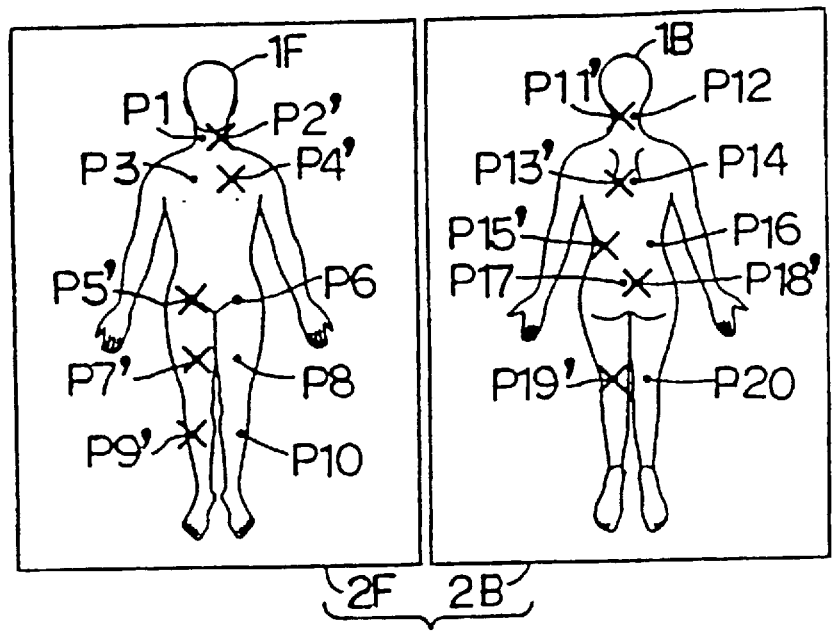
FIGS. 14a (A and B) and 14b (C and D) are illustrations showing a chart for inspecting a tender point and the skeleton tilting direction pattern chart for a further subject of inspection different from the subject of inspections of FIGS. 12 and 13.

Next, discussion will be given for another example of the inspected tender point pattern with reference to FIGS. 14a (A and B) and 14b (C and D). At first, as shown in FIG. 14a, A, the inspected tender points P2', P4', P5', P7', P9' are established in the front side tender point inspection chart 2F. On the other hand, as shown in FIG. 14a, B, the inspected tender points P11', P13', P15', P18', P19' are established in the back side tender point inspection chart 2B. Accordingly, both of the inspected tender point patterns in the front side tender point inspection chart 2F and the back side tender point inspection chart 2B are not symmetric. Therefore, judgement can be made that the skeleton causes non-parallel tilt. Then, the inspected tender point patterns shown in FIGS. 14a A and B, are approximately matched with the tender point patterns of the tilting direction pattern chart 4a corresponding to the basic type of right muscular apparatus shown in FIGS. 14b, C and D. Therefore, judgement can be made that the subject of inspection's body is not in normal alignment but causes non-parallel tilt in the pattern of the basic type of the right muscular apparatus.

As set forth above, upon inspection of the tender point, the subject of inspection is required to only express whether the currently depressed tender point inspecting point is the tender point or not, by answering in "YES" or "NO" basis. Accordingly, non-alignment characteristics and tilting direction type of the skeleton of the body of the subject of inspection can be easily and accurately detected.

On the other hand, it becomes possible to perform inspection by presence of absence of the tender point of the human body according to preliminarily determined tender point inspecting points P irrespective of the external appearance of the human body, and judgement is made that the skeleton of the body causes non-parallel tilt of the subject of inspection when the inspected tender points P' are distributed asymmetrically with respect to the center line of the body on the human body chart 1. Then, when non-parallel tilt is caused in the skeleton of the human body, the tender point pattern approximately matching with the inspected tender point pattern among predetermined tender point patterns is selected. Then, judgement can be made that the skeleton causes the tilting direction type of the skeleton of the body corresponding to the selected tender point pattern. Therefore, highly qualified skill of the inspector becomes unnecessary for making judgement of the non-alignment characteristics and the tilting direction type of the skeleton of the subject of inspection.

Therefore, even by a person who has no deep knowledge about the "Kintaikei treatment", judgement of the non-alignment characteristics and the tilt direction type can be made utilizing the tender point inspection chart 2 and the tilting direction pattern chart 4 of the shown embodiment.

Furthermore, as the tilting direction measurement chart, the tender point inspection chart 2 can be prepared by printing the human body chart 1 and the tender point inspecting points P and the tilting direction pattern chart 4 can be prepared by printing the human body chart 1 and the tender point designating points Q. Accordingly, it becomes possible to produce a large number of the tender point inspection chart 2 and the tilting direction pattern chart 4 for lowering of the production cost. Then, putting mark "x" on the tender point inspection chart 2 by the tester with pencil, ball-point pen, felt pen, fountain pen and so forth. As set forth above, judgement of the non-alignment characteristics and the tilting direction type of the skeleton of the body of the subject of inspection can be made by employing the non-parallel alignment measuring charts printed on the paper and inexpensive writing tool without requiring expensive X-ray inspection or photographing equipments.

It should be noted that while the shown embodiment has been explained in the case where the non-alignment measuring chart is printed on a paper or so forth, it is possible to preliminarily store the non-alignment measuring chart in a storage device in a generally used computer. Then, when the inspected tender points P' are established, arbitrary mark indicative of the inspected tender point P1' is put on the relevant inspected tender points P' by means of an arbitrary input device, such as a cursor key, mouse, light pen or so forth. Thereafter, the tender point pattern approximately matching with the inspected tender point pattern consisted of a plurality of inspected tender points P1' may be retrieved and selected by a central processing unit (CPU) of the computer, and the tilting direction type corresponding to the retrieved and selected tender point pattern is displayed on the display screen of the computer.

For example, by putting the mark "x" on the tender point inspecting points P, the inspected tender points P' are established. In the alternative, mark "○", "Δ", "→", "☆", "✕" can be used in place of the mark "x", or the inspected tender point P' can be indicated by providing the color of red, blue or yellow.

Thus, when the tender point pattern and the tender point inspection points P are established, determination is made as follow. The manner of determination will be discussed with reference to FIGS. 15A to 15G.

At first, with respect to the people having particular asymmetric type, tender points are inspected. On the tender point retrieving charts 5, the tender point retrieving points R are established (see FIG. 15A). Next, common tender point retrieving points R on these people are determined. By putting these common tender point retrieving points R on the human body chart 3, tender point designating points Q are established (see FIG. 15D). Namely, the distribution of the tender point designating points Q are established as the tender point pattern.

The foregoing process is performed for people of all tilting direction type to determine the tender point patterns corresponding to respective tilting direction types (see FIGS. 15B, 15E and 15C, 15F).

Figure 15:
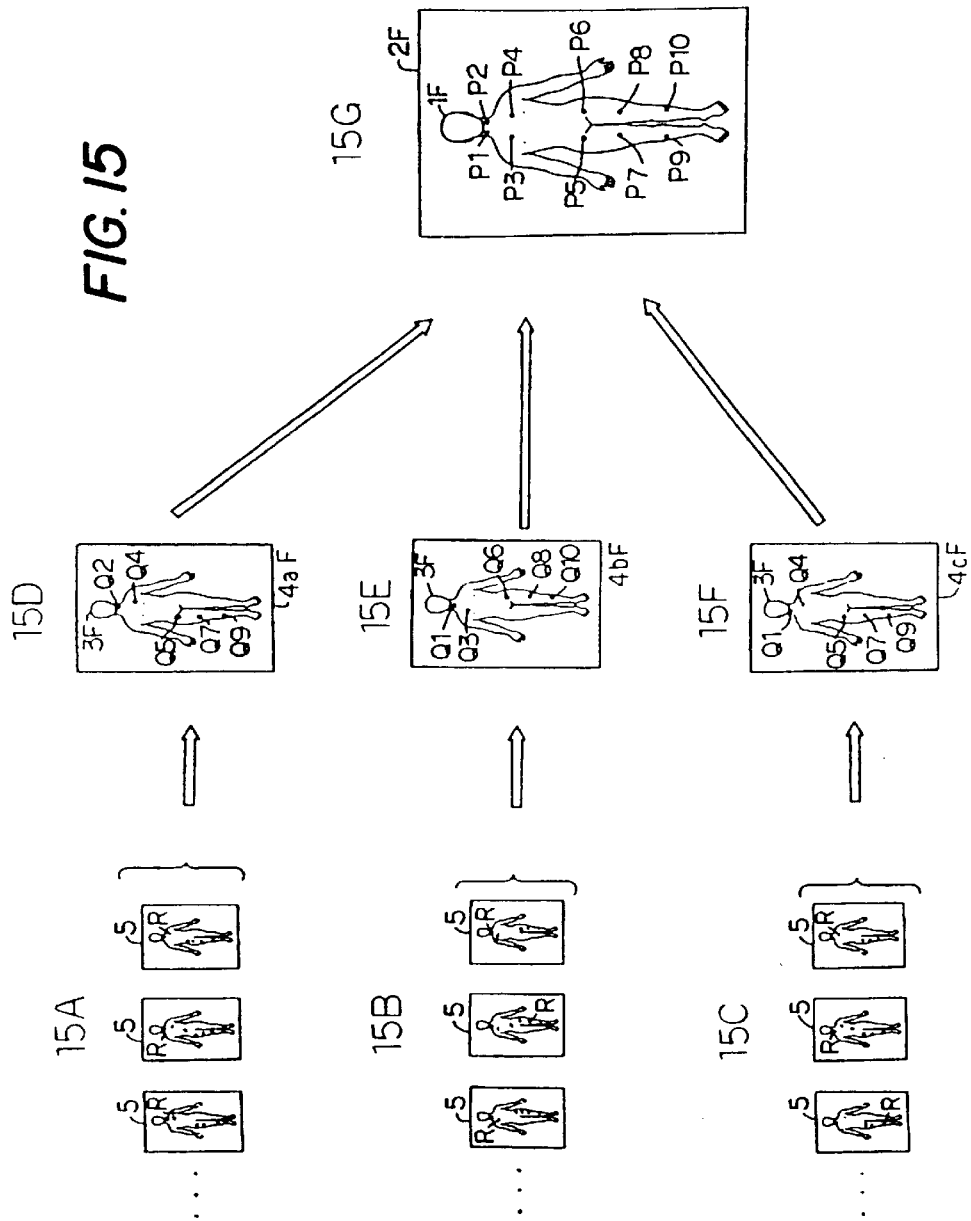
FIGS. 15A to 15G are illustrations showing a tender point pattern and a manner of determining inspection points for the tender points.

It should be noted that FIG. 15D illustrates front side tilting direction type pattern chart 4aF, FIG. 15E illustrates the front side tilting direction type pattern 4bF, and FIG. 15F illustrates the front side tilting pattern type chart 4cF.

Next, all of the tender point designating points Q forming the tender point patterns corresponding to respective of the tilting direction types are put on the human body chart 1 shown in FIG. 15G. The tender point designating points Q put on the human body chart 1 are taken as tender point inspecting points P. It should be noted that, in the shown example, only three tender point pattern are shown, other tender points are neglected, and only front side of the human body, shown for the convenience of disclosure. As set forth above, after preliminarily determining the tender point patterns and the tender point inspecting points P, judgement of the non-alignment characteristics and the tilting direction type of the skeleton of the subject of inspection can be performed.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For instance, it is also possible to set the tender point patterns and the tender point inspecting points P by those knowledgeable about the Kintaikei treatment, instead of establishing those through the process set forth above. For example, by tracing a path of nerve controlling the portion on the subject of inspection's body where the symptom is perceptible, the portion of the subject of inspection where asymmetry is caused can be determined. Then, the tender point can be found. By this, the relationship between the symptom pattern and the tender points can be established.

Also, while the present invention has been discussed in terms of the embodiment where respective ten tender point inspecting points P are given on the front side tender point inspection chart 2F and the back side tender point inspection chart 2B, the number of tender point inspecting points is not specified to the shown embodiment but can be set arbitrarily depending upon necessity, object of the inspection and so forth.

As set forth above, since the chart for measurement of the non-alignment characteristics and the tilting direction type of the human body, according to the present invention is established by placing a plurality of tender point inspecting points at symmetric positions on the human body, by establishing tender point patterns corresponding to the tilting direction types on the basis of a plurality of tender points and distribution thereof, and by providing a plurality of tilting direction pattern charts respectively. Thus, by checking each tender point inspecting point whether the tender point is present at the corresponding position to detect the tender point inspecting points having the tender points as the inspected tender points, check can be made whether the distribution of the tender points is symmetric with respect to the center line of the body or not to make judgement whether the non-parallel tilt is caused in the skeleton of the human body. Also, when the non-parallel tilt is caused, the tilting direction type can be detected by comparing the tender point pattern derived from the distribution of the inspected tender points with a plurality of predetermined or preset tender point patterns for finding out one of the pattern approximately matching therewith. Therefore, the non-alignment characteristics and the tilting direction type corresponding to the tender point pattern can be easily and accurately determined. Thus, it may facilitate subsequent treatment by providing accurate information of the non-alignment characteristics and the tilting direction type of the skeleton of the patient. With the chart according to the present invention, the tester is not required high skill in making judgement of non-parallel tilt of the subject of inspection's body and the tilting direction type thereof. Furthermore, since the present invention requires, only chart, such as the chart printed on a paper, cost for inspection can be significantly lowered.

What is claimed is:

1. A chart for determining non-alignment characteristics and tilting direction type of a human body, which chart is suitable for diagnosing an ailment, comprising:

a tender point inspection chart containing a human body chart illustrating a human body, and a plurality of tender point inspection points for a human body where upon inspection of said inspection points on a human, the presence or absence of a tender point is determined, wherein said plurality of tender point inspection points are symmetric at both lateral sides with respect to a center axis of the human body;

a tilting direction pattern chart containing a human body chart, a plurality of tender point designation points arranged at positions respective to tender points which tender points arc illustrative of tender point patterns respective to tilting direction types, muscular apparatus respectively associated with tilting direction types, and symptom patterns respectively corresponding to said muscular apparatus, and said tilting direction pattern chart including a plurality of charts illustrating distribution of tender points respectively corresponding to the tilting direction types.

2. The chart as set forth in claim 1, wherein said tender point inspection chart and said tilting direction pattern charts are recorded on sheet form medium, separately from each other.

3. The chart as set forth in claim 2, wherein said sheet form medium is a paper.

4. The chart as set forth in claim 1, wherein said tender point inspection chart and said tilting direction pattern chart are stored in a storage device of a computer system.

5. A method for diagnosing an ailment on the basis of determining distribution of tender points on a human body and determining non-alignment characteristics and tilting direction type of the human body comprising the steps of:

(a) providing a tender point inspection chart containing a human body chart illustrating a human body, and a plurality of tender point inspection points for a human body, where upon inspection of said inspection points on a human body, the presence or absence of a tender point, is determined wherein said plurality of tender point inspection points are symmetric at both lateral sides with respect to a center axis of the human body;

(b) applying pressure to portions of a human body which correspond to the tender point inspection points on said tender point inspection chart and determining which portions, if any, when pressure is applied are associated with pain, and are therefore tender points;

(c) determining any pattern formed by the tender points; and (d) comparing the pattern of step (c) with said tender point inspection chart and determining non-alignment characteristics and tilting direction type based on whether a non-parallel tilt of a skeleton of said human body is present based on the symmetry of the pattern of step (c) with respect to a center axis of said human body, and thereby diagnosing an ailment, if any, of the human body.

6. The method as set forth in claim 5, wherein step (a) further includes:

providing a tilting direction pattern chart containing a human body chart, a plurality of tender point designation points arranged at positions respective to tender points which tender points are illustrative of tender point patterns respective to tilting direction types, muscular apparatus respectively associated with tilting direction types, and symptom patterns respectively corresponding to said muscular apparatus, and said tilting direction pattern chart including a plurality of charts illustrating distribution of tender points respectively corresponding to the tilting direction types;

where non-parallel tilt is determined to be present in said human body by comparing the pattern of step (c) with said plurality of tender point patterns and statistically determining tilting direction type of said human body.

* * * * *